(12) United States Patent
Prasad et al.

(10) Patent No.: US 9,164,777 B2
(45) Date of Patent: Oct. 20, 2015

(54) DETERMINING THE DISPLAY OF EQUAL SPACING GUIDES BETWEEN DIAGRAM SHAPES

(75) Inventors: Ankit Prasad, Palo Alto, CA (US); Jeffrey Chao-Nan Chen, Cupertino, CA (US); Onur Onder, Mountain View, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 553 days.

(21) Appl. No.: 13/220,725

(22) Filed: Aug. 30, 2011

(65) Prior Publication Data

US 2013/0050264 A1  Feb. 28, 2013

(51) Int. Cl.
*G06T 11/20*  (2006.01)
*G06F 9/44*  (2006.01)

(52) U.S. Cl.
CPC .................................... *G06F 9/4443* (2013.01)

(58) Field of Classification Search
CPC ....................................................... G06F 17/50
USPC ................................................. 345/643, 441
See application file for complete search history.

(56) References Cited

U.S. PATENT DOCUMENTS

| | | | |
|---|---|---|---|
| 5,299,307 A | 3/1994 | Young | |
| 5,745,099 A | 4/1998 | Blomqvist | |
| 5,774,111 A | 6/1998 | Lecland et al. | |
| 5,798,761 A | 8/1998 | Isaacs | |
| 5,883,636 A | 3/1999 | Hayashi et al. | |
| 5,894,310 A | 4/1999 | Arsenault et al. | |
| 6,065,021 A | 5/2000 | George | |
| 6,568,938 B1 | 5/2003 | Prince et al. | |
| 7,123,259 B2 | 10/2006 | Cabral et al. | |
| 7,467,351 B1 | 12/2008 | Spells et al. | |
| 7,545,392 B2 | 6/2009 | Sprang et al. | |
| 7,589,750 B1 | 9/2009 | Stratton | |
| 7,614,000 B2 | 11/2009 | Villaron et al. | |
| 7,751,623 B1 | 7/2010 | Simmons et al. | |
| 2002/0140736 A1 | 10/2002 | Chen | |
| 2004/0239691 A1 | 12/2004 | Sprang et al. | |
| 2005/0068290 A1 | 3/2005 | Jaeger | |

(Continued)

FOREIGN PATENT DOCUMENTS

| | | |
|---|---|---|
| CN | 1677343 | 10/2005 |
| CN | 1838071 | 9/2006 |

(Continued)

OTHER PUBLICATIONS

Jansen (When smart guides turn blue, 2011).*

(Continued)

*Primary Examiner* — Ke Xiao
*Assistant Examiner* — Kyle Zhai
(74) *Attorney, Agent, or Firm* — Steve Crocker; Jim Ross; Micky Minhas

(57) ABSTRACT

Technologies are described herein for determining the display of equal spacing guides between diagram shapes. The nearest neighbors of each shape in a diagram are determined, and the distances between each shape and its nearest neighbors are calculated. When an active shape in the diagram is positioned or moved, spacing guides are displayed between shapes having equidistant spacing when the calculated distances between shapes become equal to a distance between the active shape and one of its nearest neighbors.

18 Claims, 7 Drawing Sheets

(56) References Cited

U.S. PATENT DOCUMENTS

| | | | |
|---|---|---|---|
| 2006/0008779 | A1 | 1/2006 | Shand et al. |
| 2006/0259872 | A1* | 11/2006 | Mullen et al. .................. 715/764 |
| 2006/0259875 | A1 | 11/2006 | Collins et al. |
| 2006/0282759 | A1 | 12/2006 | Collins et al. |
| 2009/0217187 | A1* | 8/2009 | Kendall et al. ................ 715/765 |
| 2009/0217206 | A1 | 8/2009 | Liu et al. |
| 2010/0020101 | A1 | 1/2010 | Schormann |
| 2010/0218100 | A1 | 8/2010 | Simon et al. |
| 2011/0050686 | A1 | 3/2011 | Nojima et al. |
| 2013/0106917 | A1 | 5/2013 | Altin et al. |
| 2013/0145305 | A1 | 6/2013 | Maloney et al. |
| 2013/0268854 | A1 | 10/2013 | Altin et al. |

FOREIGN PATENT DOCUMENTS

| | | |
|---|---|---|
| CN | 101194504 | 6/2008 |
| CN | 102105850 | 6/2011 |
| TW | 200901019 | 1/2009 |
| WO | WO2008076079 | 6/2008 |

OTHER PUBLICATIONS

"Basic Shapes Development", Retrieved at <<http://msdn.microsoft.com/en-us/library/aa140248%28v=office.10%29.aspx>>, Oct. 2000, pp. 13.

Grossbart, et al., "Nearest Neighbor Analysis: Inferring Behavioral Processes From Spatial Patterns", Retrieved at <<http://www.acrwebsite.org/volumes/display.asp?id=9414>>, Advances in Consumer Research, vol. 5, 1978, pp. 114-118.

U.S. Official Action dated Nov. 17, 2013 in U.S. Appl. No. 13/439,881.

U.S. Official Action dated Oct. 4, 2013 in U.S. Appl. No. 13/310,801.

European Search Report dated Mar. 15, 2013 in European Application No. 12195574.4.

"Microsoft PowerPoint 2010 Product Guide", Published on Jan. 30, 2012, Available at: http://download.microsoft.com/download/7/1/6/71629716-1715-414B-87D5-298633009207/Microsoft%20PowerPoint%202010%20Product%20Guide_Final.docx, pp. 82.

Cohen, Sandee, "Align and Space Objects with InDesign's Smart Guides", Published on: Dec. 11, 2011, Available at: http://www.creativepro.com/article/align-and-space-objects-indesigns-smart-guides, pp. 10.

"The Power of Smart Guides", Published on: Mar. 31, 2010, Available at: http://vectips.com/tips-and-tricks/the-power-of-smart-guides/, pp. 20.

Blatner, David, "Building an Org Chart or Flowchart in InDesign, Part 2", Published on: Oct. 28, 2010, Available at: http://indesignsecrets.com/building-an-org-chart-or-flowchart-in-indesign-part-2.php, pp. 10.

"Ruler guides", Published on: Jan. 30, 2012, Available at: http://help.adobe.com/en_US/InDesign/6.0/WSfd1234e1c4b69f30d2a5051004d659b1c-7fefa.html#WSa285fff53dea4f8617383751001ea8cb3f-7126a, pp. 9.

Watkins, Craig, "Rulers, Grids & Guides", Published on: Jan. 30, 2012, Available at: http://www.illustratortips.com/index.php/Instruction/Beginner-Tips/rulers-grids-a-guides.html, pp. 8.

"Differentiating Between Editable and Uneditable Guides", Filed Date: Dec. 5, 2011, U.S. Appl. No. 13/310,801, pp. 33. Inventors: Maloney et al.

Hunt, Paul "Photoshop Elements, Grids," Published on: Oct. 18, 2010, Available at: http://www.phtokaboom.com/photography/learn/photoshop_elements/grids/1_make_grid.htm, 4 pp.

"Help/Adobe/Using inDesign CS5/Layout Ruler Guides," Published on: Jun. 13, 2010, Available at: http://help.adobe.com, 4pp.

"DTP Tools Help> Plug-ins for InDesign/InCopy> Layer Groups" Published on: Nov. 2, 2009, 1 pg.

"How to implement a basic action listener in InDesign," Published on: Nov. 22, 2011, 4 pp.

"Selecting objects with selection tools," Published on: Jan. 1, 2010, In: Canvas 12. User Guide, ACD Systems of America, p. 160, 4 pp.

"Aligning and distributing objects," Published on: Nov. 30, 2011, Available at: http://help.adobe.com/en_US/indesign/cs/using/WS40FBD15DA9F9-4f1c-9DF9-6A673EC4C172a.html, 5 pp.

"ActivInspire in the ActivClassroom," Published on: Nov. 30, 2011, Available at: http://www.prometheanplanet.com/documents/uk-us/pdf/support/user-guides-docs/activinspire/activinspire-in-the-activclassroom.pdf, 36 pp.

"Layers," Published on: Dec. 1, 2011, Available at: http://help.adobe.com/en_US/InDesign/6.0/WSa285fff53dea4f8617383751001ea8cb3f-70e8a.html, 8 pp.

Translated the Chinese Office Action mailed Apr. 9, 2015 for Chinese patent application No. 201210313094.9, a counterpart foreign application of U.S. Appl. No. 13/220,725, 8 pages.

"Alignment Using Drawing Guides on a PowerPoint Slide", Published on: Sep. 1, 2011, Available at http://www.aspirecommunications.com/newsletter-design-alignment-using-drawing-guides.html, pp. 2.

"Office Action Issued in Chinese Patent Application No. 201210424635.5", Mailed Date: Aug. 20, 2014, 10 Pages.

Chinese Official Action dated Nov. 5, 2014, in Chinese Application No. CN 201210313094.9, 12 pages.

Chienese Office Action mailed Dcember 12, 2014 for Chiense patent application No. 201210514597.2, a counterpart foreign application of U.S. Appl. No. 13/310,801, 12 pages.

"Inkscape Interface", Published on: Sep. 1, 2011, Available at: http://en.flossmanuals.net/inkscape/ch003_the-inkscape-interface, pp. 6.

Johnson, S. "Working with Guides, Grid & Slices", Published on: Dec. 15, 2008, Available at: http://www.informit.com/articles/article.aspx?p=1312599&seqNum=8, pp. 2.

Lechat, F., "How to Add Guides in PowerPoint", Published on: Oct. 5, 2010, Available at http://www.ehow.com/how_7289659_addguides-powerpoint.html, pp. 4.

Office Action from the U.S. Appl. No. 13/310,801, mailed Oct. 23, 2014.

Office action for U.S. Appl. No. 13/439,881, mailed on Feb. 12, 2015, Altin et al., "Utilizing Drawing Guides in Determining the Display of Smart Guides in a Drawing Program", 14 pages.

Office Action for U.S. Appl. No. 13/310,801, dated May 22, 2014.

Office Action from the U.S. Appl. No. 13/439,881, mailed May 22, 2014.

Notice of Allowance for U.S. Appl. No. 13/285,010, mailed on Jun. 9, 2014.

Olsen, Ruben, "Chapter 6: Making your Diagram Look Good," Oct. 2010. OmniGraffle 5 Diagramming Essentials, 47 pages.

Patowary, "Use Drawing Guides to Align Objects in PowerPoint", retrieved on Jan. 6, 2015, at http://www.instantfundas.com/2011/06/use-drawing-guides-to-align-objects-in.html, Instant Fundas, 2013, 3 pages.

"Preparation of Flow Cytometry Figures Using FlowJo and Canvas", Published on: Sep. 1, 2011, Available at: http://www.microbiology.emory.edu/altman/f_protocols/f_flowCytometry/flowFigures_p2.html, pp. 11.

"Ruler Guides," Retrieved at <<http://help.adobe.com/en_US/InDesign/6.0/WSfd1234e1c4b69f30d2a5051004d659b1c-7fefa.html>>, Retrieved Date: Sep. 1, 2011, pp. 8.

Zhang, Xinkui, "Fully use of alignment and layout function of Photoshop," Computer Knowledge and Technology, 2007, Issue 7, 3 pages.

* cited by examiner

DETERMINING THE DISPLAY OF EQUAL SPACING GUIDES BETWEEN DIAGRAM SHAPES

BACKGROUND

When placing shapes or other objects in a diagramming or drawing application, the user often wants equal spacing between the shapes. The drawing application may show spacing guides between the various shapes on in the diagram in order to assist the user in spacing the shapes or objects relative to each other. In addition, the shape being placed or moved may "snap" to a position of spacing between it and neighboring shapes equal to that between other shapes in the diagram, with spacing guides displayed to show the equal spacing between the various shapes.

Some diagramming or drawing applications may only show spacing guides between adjacent or consecutive shapes or objects, which may be too limited to be helpful to the user. Other applications may show spacing guides between any pair of shapes having equal spacing. However, in a large diagram with many shapes, this may be computationally intensive and result in an unacceptable amount of "noise," i.e. too many irrelevant spacing guides shown on the diagram.

It is with respect to these considerations and others that the disclosure made herein is presented.

SUMMARY

Technologies are described herein for determining the display of equal spacing guides between diagram shapes. Utilizing the technologies described herein, a novel method of determining shapes or objects in a diagram between which to show equal spacing guides may be implemented. The shapes or objects in the diagram with which a user is likely concerned in regard to spacing are selected deterministically, allowing a limited but applicable set of equal spacing guides to be shown between the selected shapes when appropriate. This may result in a less computationally intensive solution that produces less noise than showing guides between any two objects on the canvas with equal spacing, while being more helpful to the user than limiting equal spacing guides to only adjacent or consecutive shapes.

According to embodiments, the nearest neighbors of each shape in the diagram are determined, and the distances between each shape and its nearest neighbors are calculated. When an active shape in the diagram is positioned or moved, spacing guides are displayed between shapes having equidistant spacing when the calculated distances between shapes become equal to a distance between the active shape and one of its nearest neighbors.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for determining the display of equal spacing guides between diagram shapes. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof and that show, by way of illustration, specific embodiments or examples. In the accompanying drawings, like numerals represent like elements through the several figures.

Figure 1:
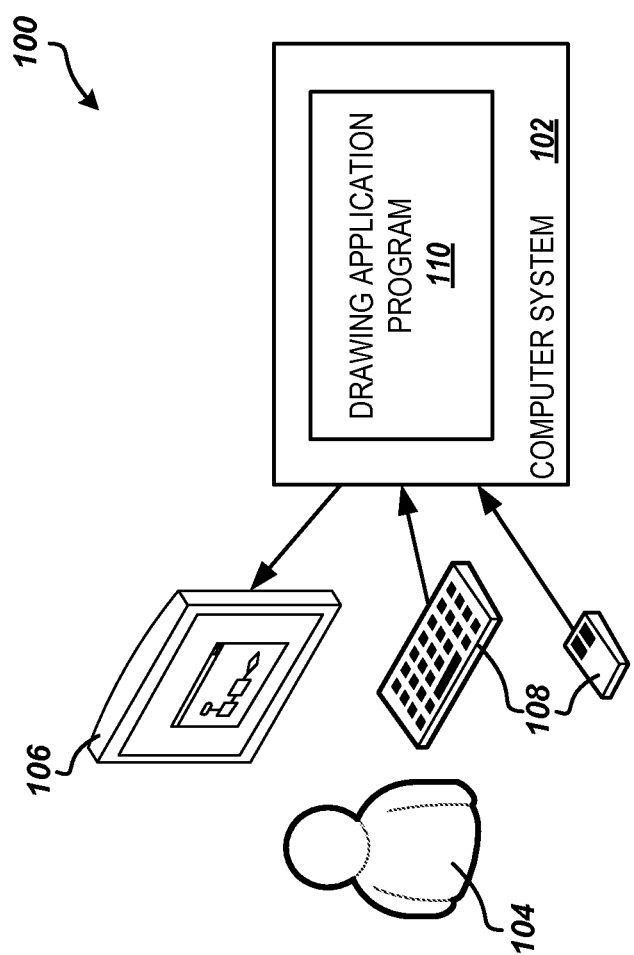
FIG. 1 is a block diagram showing aspects of an illustrative operating environment and software components provided by the embodiments presented herein.

FIG. 1 shows an illustrative operating environment 100 including software components for determining the display of equal spacing guides between diagram shapes, according to embodiments provided herein. The environment 100 includes a computer system 102. The computer system 102 may represent a user computing device, such as a personal computer ("PC"), a desktop workstation, a laptop, a notebook, a mobile device, a personal digital assistant ("PDA"), and the like. Alternatively, the computer system 102 may represent a user computing device operatively connected to one or more application servers, Web servers, database servers, network appliances, dedicated hardware devices, and/or other server computers or user computing devices known in the art. The computer system 102 is accessed by a user 104 through a display device 106 and one or more input devices 108, such as a keyboard and/or mouse, as shown in FIG. 1.

According to embodiments, a drawing application program 110 executes on the computer system 102 that allows the user 104 to create visual drawings and/or diagrams through the addition, manipulation, and/or removal of drawing objects, referred to herein generically as "shapes," on a drawing surface or "canvas." For example, the drawing application program 110 may be the MICROSOFT® POWERPOINT® presentation application from Microsoft Corp. of Redmond, Wash. The drawing application program 110 may execute locally on the user computing device of the computer system 102, or may execute on a server computer, such as a Web server, accessed by a client application executing on the user computing device. The drawing application program 110 may be implemented as hardware, software, or a combination of the two. In addition, the drawing application program 110 may include any number of application program modules and other components on the computer system 102.

Figure 2:
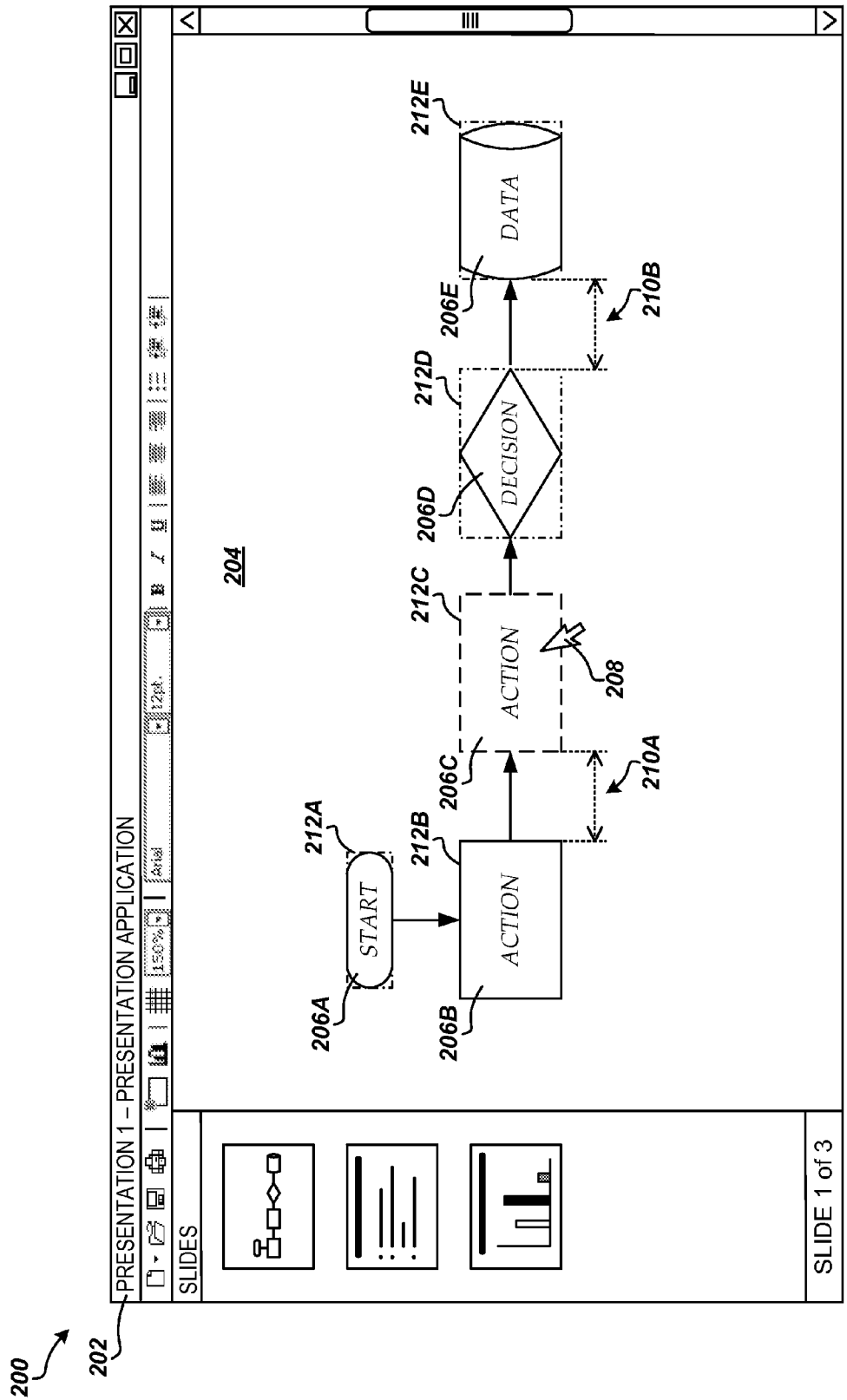
FIG. 2 is a screen diagram showing an illustrative user interface for displaying equal spacing guides between diagram shapes, according to embodiments described herein.

FIG. 2 shows an example of an illustrative user interface 200 displayed by the drawing application program 110. The user interface 200 includes a window 202 in which a number of shapes 206A-206E (referred to herein generally as shape 206 or shapes 206) are shown on a drawing canvas 204. The shapes 206 may be arranged and manipulated on the drawing canvas 204 by the user 104 using the input devices 108, such as the mouse described above. For example, the user 104 may utilize the mouse to maneuver a mouse pointer 208 over the drawing canvas 204 in order to select and move or otherwise manipulate a shape in the diagram, such as shape 206C shown in FIG. 2. A shape 206C being moved or otherwise manipulated on the drawing canvas 204 by the user may be referred to herein as the "active shape."

According to embodiments, when the active shape, such as shape 206C, is being moved or positioned on the drawing canvas 204, the drawing application program 110 may show a number of spacing guides 210A-210B (referred to herein generally as spacing guide 210 or spacing guides 210) on the canvas. The spacing guides 210 may be shown when the spacing between the active shape 206C and one or more other shapes 206 on the drawing canvas becomes equal to the spacing between other, relevant shapes on the drawing canvas, as will be described in more detail below in regard to FIG. 3. For example, the spacing guides 210A and 210B may be shown between the active shape 206C and shape 206B and between shape 206D and shape 206E, respectively, when the horizontal distance between shapes 206B and 206C and between shapes 206D and 206E becomes equal during movement of the active shape 206C. In addition, the active shape 206C may "snap" to this position of equidistant spacing while be dragged across the canvas, and the spacing guides 210A and 210B may be shown as long as the active shape 206C remains in this position.

In some embodiments, the drawing application program 110 calculates the distances between shapes on the drawing canvas 204 from a bounding box 212A-212E (referred to herein generally as bounding box 212 or bounding boxes 212) corresponding to each shape 206A-206E, instead of the actual borders of the shape itself. The bounding box 212 for a shape 206 is defined as the smallest rectangle that can fully enclose the shape. It will be appreciated that for rectangular shapes, such as shapes 206B and 206C shown in FIG. 2, the bounding boxes 212B and 212C will be the same as the shape borders, while for non-rectangular shapes, such as shapes 206A, 206D, and 206E, the bounding box 212A, 212D, and 212E may be inferred by the drawing application program 110 from the shape but not shown on the drawing canvas. In other embodiments, the drawing application program 110 may calculate the distances between shapes 206 from some other representative bounding shape or from the actual borders of the shapes themselves.

Figure 3:
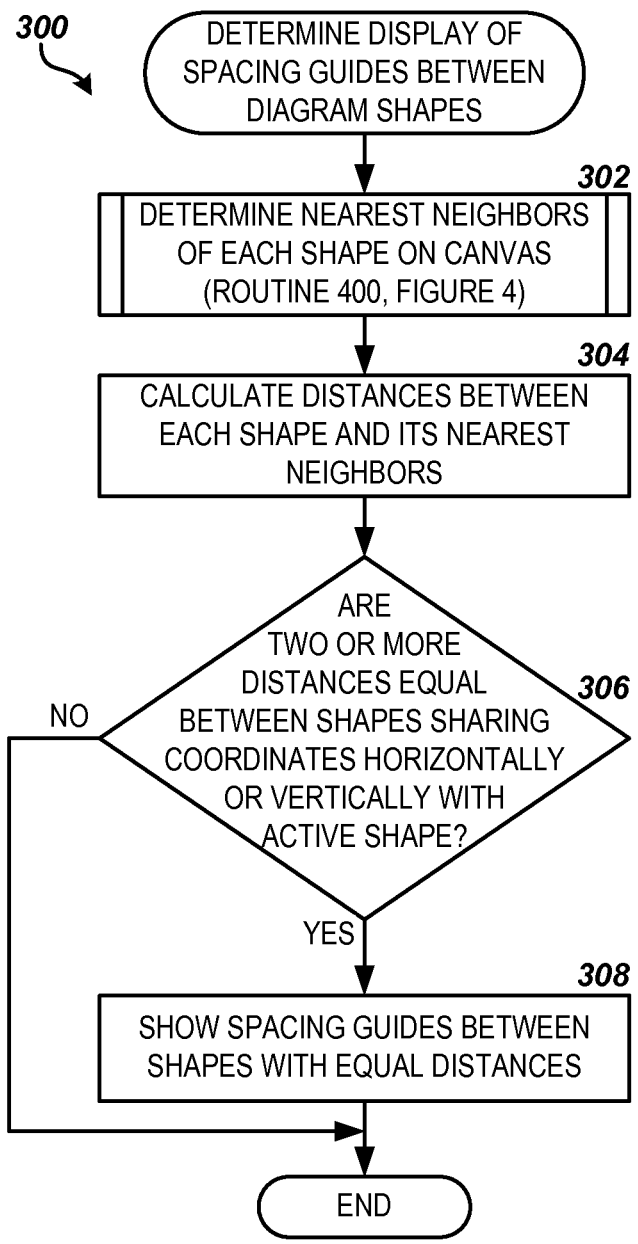
FIG. 3 is a flow diagram showing one method for determining the display of equal spacing guides between diagram shapes, according to embodiments described herein.
Figure 4:
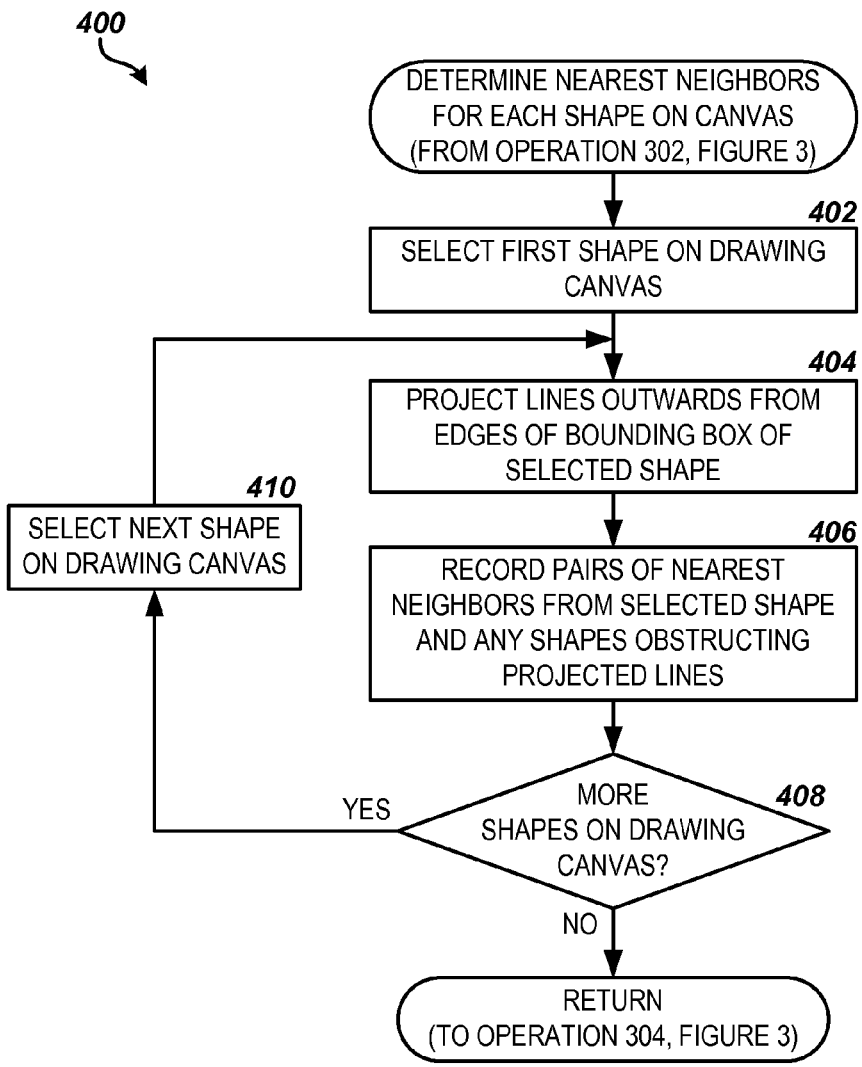
FIG. 4 is a flow diagram showing one method for determining nearest neighbors for shapes in a diagram, according to embodiments described herein.

Referring now to FIGS. 3 and 4, additional details will be provided regarding the embodiments presented herein. It should be appreciated that the logical operations described with respect to FIGS. 3 and 4 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. The operations may also be performed in a different order than described.

FIG. 3 illustrates one routine 300 for determining the shapes 206 on the drawing canvas 204 between which to display spacing guides 210, according to one embodiment. The routine 300 may be performed by the drawing application program 110 when the active shape 206C is being positioned on or moved across the drawing canvas, for example. It will be appreciated that the routine 300 may also be performed by other modules or components executing on other computing devices, or by any combination of modules, components, and computing devices.

The routine 300 begins at operation 302, where the drawing application program 110 determines the nearest neighbors for the each shape 206 on the drawing canvas 204. As will be described below, the distance calculations between shapes 206 in the diagram are performed on pairings of each shape with its nearest neighbors on the drawing canvas 204, instead of on every distinct pair of shapes in the diagram. This may dramatically reduce the processing load required to perform the distance calculations as compared to the $N^2$ computations (N being the number of shapes 206) that would be required to calculate distances between every pair or shapes in a large and complex diagram.

In one embodiment, the drawing application program 110 utilizes the routine 400 shown in FIG. 4 to determine the nearest neighbors for each shape 206 on the drawing canvas 204. The routine 400 begins at operation 402, where the drawing application program 110 selects the first shape 206 on the drawing canvas 204. It will be appreciated that the shapes 206 visible on the drawing canvas 204 may represent a subset of all the shapes in the diagram or drawing. The routine 400 proceeds from operation 402 to operation 404, where the drawing application program 110 projects lines outward from the outside edges of the bounding box 212 of the selected shape 206 across the drawing canvas 204. The projected lines extend from the edge of the bounding box 212 to the edge of the drawing canvas 204 unless they are obstructed by the bounding box of another shape 206 on the canvas.

Figure 5:
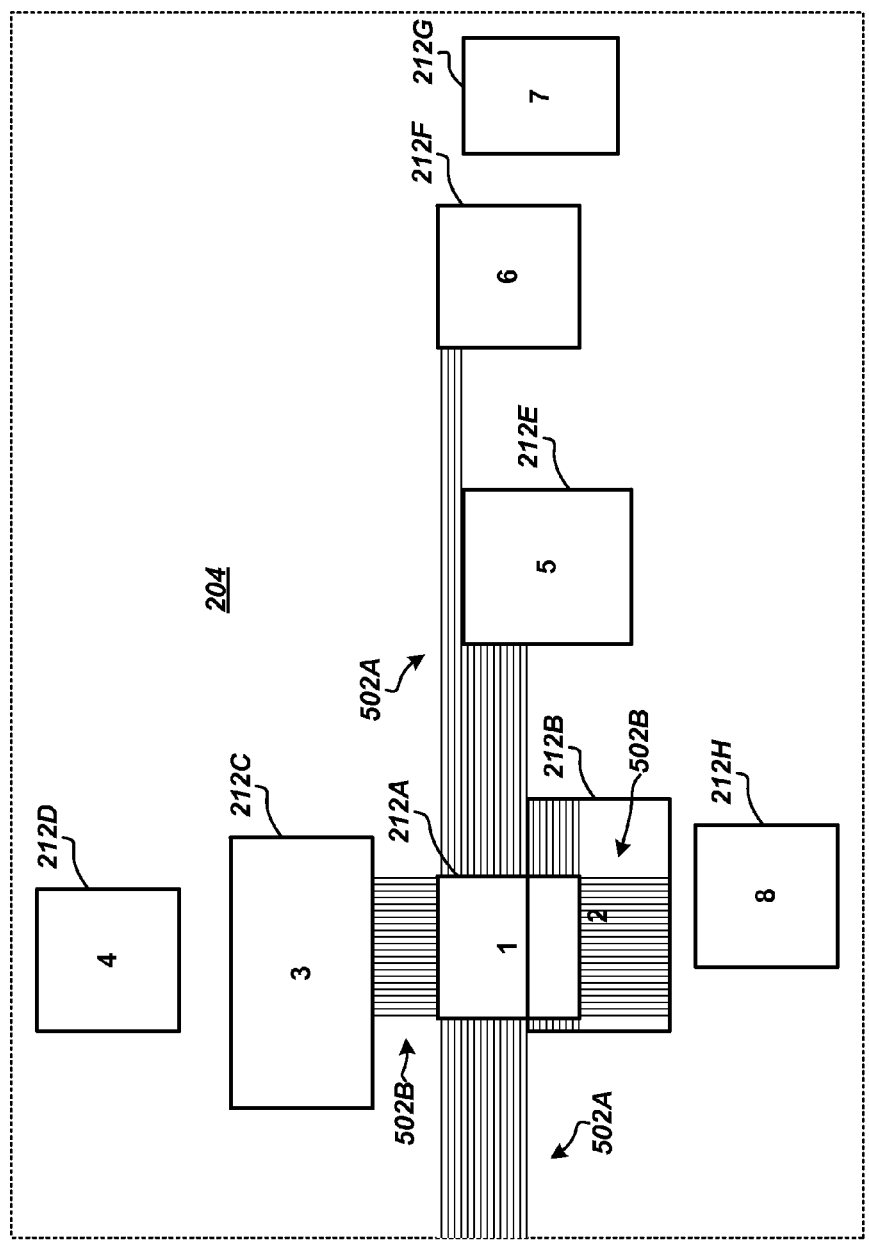
FIG. 5 is a block diagram illustrating additional details regarding the determination of nearest neighbors for a number of shapes on a drawing canvas, according to embodiments described herein.

FIG. 5 provides further details regarding operation 404. FIG. 5 shows eight shapes 206, numbered 1-8, positioned on a drawing canvas 204. For clarity, only the bounding boxes 212A-212H of the corresponding shapes 1-8 are shown. Starting with the bounding box 212A corresponding to the first shape 206, shape 1, the drawing application program 110 projects lines 502A, 502B from the outside edges of the bounding box outwards towards the edge of the drawing canvas 204. Horizontal lines 502A are projected horizontally from the vertical edges of the bounding box 212A, and vertical lines 502B are projected vertically from the horizontal edges of the bounding box. The projected lines 502A, 502B continue across the drawing canvas 204 until obstructed by a bounding box, such as bounding box 212E, corresponding to another shape 206, such as shape 5, on the drawing canvas or the edge of the canvas is reached. In one embodiment, the projected lines 502A, 502B may be obstructed by both the outside and inside edges of the obstructing bounding box, as illustrated by bounding box 212B corresponding to shape 2 shown in FIG. 5.

From operation 404, the routine 400 proceeds to operation 406, where the drawing application program 110 records pairs of nearest neighbors comprising the selected shape 206 and any other shapes with bounding boxes 212 on the drawing canvas that obstruct the projected lines 502A, 502B from the bounding box of the selected shape. For example, as shown in FIG. 5, the nearest neighbors of shape 1 would be shapes 2, 3, 5, and 6. Accordingly, the drawing application program 110 may record the pairs of nearest neighbors as 1 and 2, 1 and 3, 1 and 5, and 1 and 6.

The routine 400 proceeds from operation 406 to operation 408, where the drawing application program 110 determines whether there are more shapes 206 on the drawing canvas 204 requiring determination of their nearest neighbors. If more shapes 206 on the drawing canvas 204 require determination of their nearest neighbors, the routine 400 proceeds from operation 408 to operation 410, where the drawing application program 110 selects the next shape 206 on the drawing canvas 204. From operation 410, the routine 400 returns to operation 404 where the process is repeated until the nearest neighbors for all the shapes 206 on the drawing canvas 204 have been determined.

Once the nearest neighbors for all the shapes 206 on the drawing canvas 204 have been determined, the routine 400 returns to operation 304 of the routine 300 shown in FIG. 3. In operation 304, the drawing application program 110 calculates the distances between each shape 206 on the drawing canvas and its nearest neighbors, i.e. the distances are calculated between each pair of shapes recorded in operation 302 above. According to one embodiment, only the smallest horizontal and/or vertical distances between the bounding boxes 212 of each pair of shapes 206 are calculated. Additionally or alternatively, the distance calculations between pairs of nearest neighbors may include the horizontal and vertical distances between origins, centers, matching vertices, and/or the like of the bounding boxes 212 of the shapes 206. In addition, only the relevant distances may be calculated. For example, only the horizontal distance between the bounding boxes 212 may be calculated for a pair of nearest neighbors that have no common horizontal coordinate, while only the vertical distance may be calculated for pairs that have no common vertical coordinate.

In one embodiment, the drawing application program 110 stores the calculated distances between pairs of nearest neighbors and updates them as needed when any shape 206 on the drawing canvas 204 is added, resized, moved, removed, or otherwise manipulated in such a way that the nearest neighbors of a shape or the distances between pairs of shapes on the canvas may be changed. Alternatively, the drawing application program 110 may repeat the determination of nearest neighbors for each shape in operation 302 and the calculation of distances between pairs of nearest neighbors in operation 304 every time a shape 206 is positioned or moved on the drawing canvas 204 and a determination of the shapes 206 between which to display spacing guides 210 is required.

From operation 304, the routine 300 proceeds to operation 306, where the drawing application program 110 determines whether a current distance between the active shape 206 and a nearest neighbor has become equal to any of the distances calculated between pairs of nearest neighbors in operation 304. According to one embodiment, the equal distances must be in the same horizontal or vertical context, and the associated shapes 206 must all share some coordinates in that horizontal or vertical context. If one or more distances calculated between pairs of nearest neighbors become equal to a distance between the active shape 206 and one of its nearest neighbors, and all the shapes involved share some horizontal or vertical coordinates, the routine 300 proceeds to operation 308 where the drawing application program 110 displays the spacing guides 210 between the equally-spaced shapes, i.e. the pairs of shapes with equidistant spacing.

Figure 6:
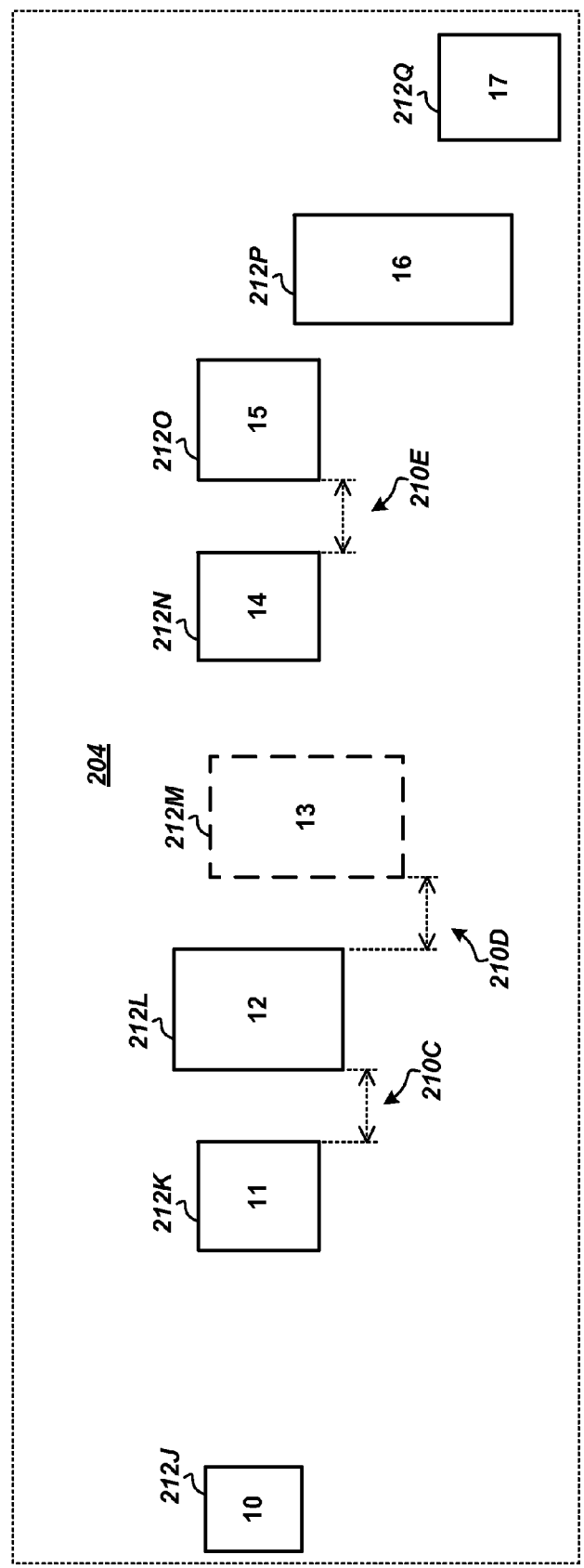
FIG. 6 is a block diagram illustrating additional details regarding the determination of the display of equal spacing guides between diagram shapes, according to embodiments described herein.

FIG. 6 provides further details regarding operations 306 and 308, described above. FIG. 6 shows eight shapes 206, numbered 10-17, positioned on a drawing canvas 204. For clarity, only the bounding boxes 212L-212Q of the corresponding shapes 10-17 are shown. As further shown in the figure, the horizontal distances between the bounding boxes 212K and 212L for shapes 11 and 12, the bounding boxes 212L and 212M for shapes 12 and 13, the bounding boxes 212N and 212O for shapes 14 and 15, and the bounding boxes 212P and 212Q for shapes 16 and 17 are currently equal. In addition, the horizontal distances between the bounding boxes 212J and 212L for shapes 10 and 12 and the bounding boxes 212M and 212P for shapes 13 and 16 are also equal. The current active shape, shape 13, is indicated by its dashed bounding box 212M.

As further shown in FIG. 6, when the currently active shape 13 is moved into the position indicated in the figure such that the horizontal distances described above become equal, the drawing application program 110 shows the horizontal spacing guides 210C, 210D, and 210E between shapes 11 and 12, shapes 12 and 13, and shapes 14 and 15, respectively. These spacing guides 210C, 210D, and 210E are shown because the distances between pairs of nearest neighbor shapes 11 and 12, 12 and 13, and 14 and 15 have all become equal in the horizontal context, and all of shapes 11, 12, 14, and 15 share coordinates horizontally with the active shape 13, i.e. a horizontal line can be drawn that intersects all of the bounding boxes 212K, 212L, 212M, 212N, and 212O, respectively.

The drawing application program 110 will not show a spacing guide 210 between shapes 16 and 17, because, while the horizontal distances between the bounding boxes 212P and 212Q for these shapes is equal to that of the other equally spaced shapes, shape 17 does not share coordinates horizontally with shape 13. In addition, the drawing application program 110 will not show equal spacing guides 210 between shapes 10 and 12 and shapes 13 and 16, because, while the horizontal distances between the bounding boxes 212J and 210L for shapes 10 and 12 and bounding boxes 212M and 212P for shapes 13 and 16 are equal, and all of these shapes share coordinates horizontally, shape 10 is not a nearest neighbor to shape 12, according to the routine 400 described, above in regard to FIG. 4. It will be appreciated that, in operation 308, the drawing application program 110 may show equal spacing guides 210 for two or more distinct equal spacings, and that both horizontal and, vertical spacing guides may be shown. From operation 308, the routine 300 ends.

While the present disclosure describes displaying equal spacing guides 210 between shapes 206 on a diagram in a drawing application, it will be appreciated that the methods and routines described herein may be utilized for displaying equal spacing guides in other contexts. For example, the same methods and routines described herein could be utilized to display equal spacing guides 210 between shapes in a diagramming application, between text or drawing objects in a presentation application, between content components in a publishing application, between document objects in a web designer application, and the like.

In addition, because it is not limited to only adjacent objects or shapes, and because nearest neighbors can be identified even if partially obscured by an intervening object, the routine 400 for the determining nearest neighbors for a shape 206 on the drawing canvas 204 may have applicability outside of the context of determining the display of equal spacing guides 210, to any determination of objects of interest in relation to a selected object. For example, the routine 400 for determining nearest neighbors of an object may be useful in determining paths for connecting traces in a circuit board design tool, in determining related objects from which to inherit properties or attributes, in determining nearest nodes in developing a multi-nodal network, or any other context in which the relative position or properties of the objects can be expressed as rectangular boxes in a two-dimensional plane, or cubes in a three-dimensional space.

Figure 7:
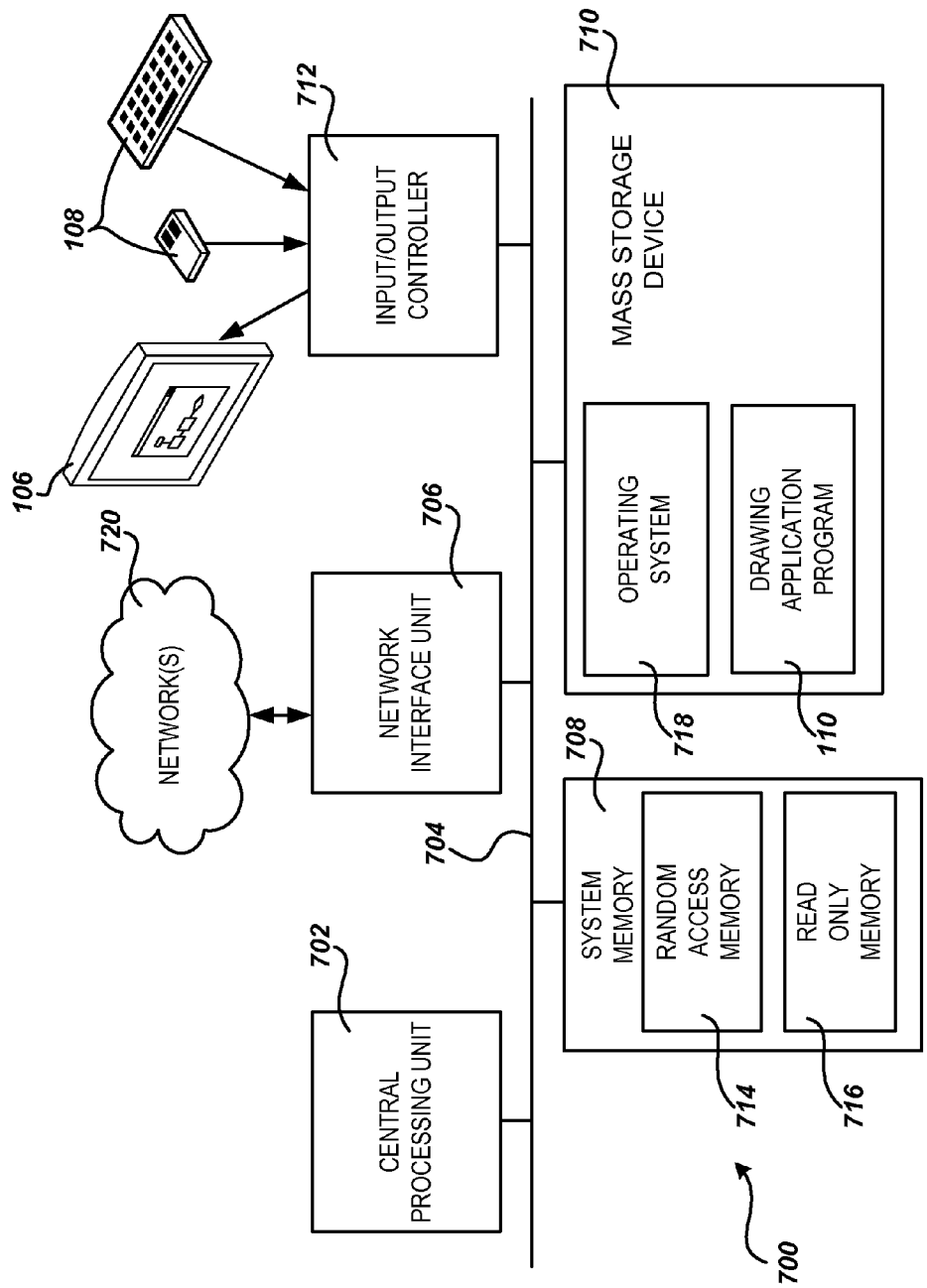
FIG. 7 is a block diagram showing an illustrative computer hardware and software architecture for a computing system capable of implementing aspects of the embodiments presented herein.

FIG. 7 shows an example computer architecture for a computer 700 capable of executing the software components described herein for determining the display of equal spacing guides between diagram shapes, in the manner presented above. The computer architecture shown in FIG. 7 illustrates a conventional desktop computer, laptop, notebook, PDA, wireless phone, server computer, or other computing device, and may be utilized to execute any aspects of the software components presented herein described as executing on the computer system 102 or other computing device.

The computer architecture shown in FIG. 7 includes one or more central processing units ("CPUs") 702. The CPUs 702 may be standard processors that perform the arithmetic and logical operations necessary for the operation of the computer 700. The CPUs 702 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and other logic elements.

The computer architecture further includes a system memory 708, including a random access memory ("RAM") 714 and a read-only memory 716 ("ROM"), and a system bus 704 that couples the memory to the CPUs 702. A basic input/output system containing the basic routines that help to transfer information between elements within the computer 700, such as during startup, is stored in the ROM 716. The computer 700 also includes a mass storage device 710 for storing an operating system 718, application programs, and other program modules, which are described in greater detail herein.

The mass storage device 710 is connected to the CPUs 702 through a mass storage controller (not shown) connected to the bus 704. The mass storage device 710 provides non-volatile storage for the computer 700. The computer 700 may store information on the mass storage device 710 by transforming the physical state of the device to reflect the information being stored. The specific transformation of physical state may depend on various factors, in different implementations of this description. Examples of such factors may include, but are not limited to, the technology used to implement the mass storage device, whether the mass storage device is characterized as primary or secondary storage, and the like.

For example, the computer 700 may store information to the mass storage device 710 by issuing instructions to the mass storage controller to alter the magnetic characteristics of a particular location within a magnetic disk drive, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description. The computer 700 may further read information from the mass storage device 710 by detecting the physical states or characteristics of one or more particular locations within the mass storage device.

As mentioned, briefly above, a number of program modules and data files may be stored in the mass storage device 710 and RAM 714 of the computer 700, including an operating system 718 suitable for controlling the operation of a computer. The mass storage device 710 and RAM 714 may also store one or more program modules. In particular, the mass storage device 710 and the RAM 714 may store the drawing application program 110, which was described in detail above in regard to FIG. 1. The mass storage device 710 and the RAM 714 may also store other types of program modules or data.

In addition to the mass storage device 710 described above, the computer 700 may have access to other computer-readable media to store and retrieve information, such as program modules, data structures, or other data. It should be appreciated by those skilled in the art that computer-readable media may be any available media that can be accessed by the computer 700, including computer-readable storage media and communications media. Communications media includes transitory signals. Computer-readable storage media includes volatile and non-volatile, removable and non-removable media implemented in any method or technology for the storage of information, such as computer-readable instructions, data structures, program modules, or other data. For example, computer-readable storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 700.

The computer-readable storage medium may be encoded with computer-executable instructions that, when loaded into the computer 700, may transform the computer system from a general-purpose computing system into a special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the computer 700 by specifying how the CPUs 702 transition between states, as described above. According to one embodiment, the computer 700 may have access to computer-readable storage media storing computer-executable instructions that, when executed by the computer, perform the routines 300 and 400 for determining the display of equal spacing guides between diagram shapes, described above in regard to FIGS. 3 and 4.

According to various embodiments, the computer 700 may operate in a networked environment using logical connections to remote computing devices and computer systems through one or more networks 720, such as a LAN, a WAN, the Internet, or a network of any topology known in the art. The computer 700 may connect to the network 720 through a network interface unit 706 connected to the bus 704. It should be appreciated that the network interface unit 706 may also be utilized to connect to other types of networks and remote computer systems.

The computer 700 may also include an input/output controller 712 for receiving and processing input from a number of input devices 108, including a keyboard, a mouse, a touchpad, a touch screen, an electronic stylus, or other type of input device. Similarly, the input/output controller 712 may provide output to a display device 106, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for determining the display of equal spacing guides between diagram shapes are provided herein. Although the subject matter presented herein has been described in language specific to computer structural features, methodological acts, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described, herein without following the example embodiments and applications illustrated and described, and without departing from the true spirit and scope of the present invention, which is set forth in the following claims.

What is claimed is:

1. A computer-implemented method for displaying spacing guides between shapes in a diagram, the method comprising executing instructions in a computer system to perform the operations of:
    determining, by the computer system, nearest neighbors of each shape in the diagram by
    projecting, from each shape, a plurality of horizontal and vertical lines outward along a length of vertical and horizontal outer edges of a bounding box corresponding to each shape, and
    recording a second shape in the diagram as a nearest neighbor of at least one shape if the second shape has a bounding box that obstructs at least one previously unobstructed horizontal or vertical line of the plurality of the projected plurality of horizontal and vertical lines;
    calculating, by the computer system, distances between each shape in the diagram and the nearest neighbors of each shape by calculating a horizontal distance and a vertical distance between the bounding boxes corresponding to the shapes;
    determining, by the computer system, whether one or more of the calculated distances are equal to a distance between an active shape and a nearest neighbor of the active shape; and
    upon determining that one or more of the calculated distances are equal to the distance between the active shape and the nearest neighbor of the active shape, displaying, on a display, spacing guides between the active shape and the nearest neighbor of the active shape and between each shape in the diagram and the nearest neighbors of that shape having the calculated distances between them equal to the distance between the active shape and the nearest neighbor of the active shape.

2. The computer-implemented method of claim 1, wherein the spacing guides are only displayed between shapes sharing coordinates horizontally or vertically with the active shape.

3. The computer-implemented method of claim 1, wherein the bounding box of each shape is defined as a smallest rectangle that fully encloses the shape.

4. The computer-implemented method of claim 1, wherein the determination of the nearest neighbors of each shape and the calculation of distances between each shape and the nearest neighbors of that shape are performed for shapes on a visible drawing canvas of a drawing application program.

5. The computer-implemented method of claim 1, wherein the determining, calculating, and displaying operations are performed in response to a position of the active shape being changed.

6. An optical disk, magnetic storage device, or solid state storage device encoded with computer-executable instructions that, when executed by a computer, cause the computer to:
    select a first object from a plurality of drawing objects positioned on a drawing canvas in a two-dimensional plane;
    determine nearest neighbors of each shape in the drawing canvas by
        projecting a plurality of horizontal and vertical lines outward along a length of vertical and horizontal outer edges of the first object across the plane;
        identifying as nearest neighbors of the first object other objects from the plurality of objects that obstruct at least one previously unobstructed horizontal or vertical line of the plurality of projected plurality of horizontal and vertical lines;
    calculate horizontal distances between each drawing object on the drawing canvas and the nearest neighbors of that drawing object; and
    determine whether one or more of the calculated horizontal distances are equal to a horizontal distance between an active drawing object and a nearest neighbor of the active drawing object.

7. The optical disk, magnetic storage device, or solid state storage device of claim 6, encoded with further computer-executable instructions that cause the computer to:
    select a next object from the plurality of objects; and
    repeat the projecting and identifying operations until the nearest neighbors for all of the plurality of objects have been identified.

8. The optical disk, magnetic storage device, or solid state storage device of claim 6, wherein the projected horizontal and vertical lines are obstructed by the outside or inside edges of bounding boxes corresponding to the other objects.

9. The optical disk, magnetic storage device, or solid state storage device of claim 8, wherein the bounding box corresponding to each of the plurality of objects is defined as a smallest rectangle that fully encloses the object.

10. The optical disk, magnetic storage device, or solid state storage device of claim 6, encoded with further computer-executable instructions that cause the computer to: upon determining that one or more of the calculated horizontal distances are equal to the horizontal distance between the active drawing object and the nearest neighbor of the active drawing object, display horizontal spacing guides between the active drawing object and the nearest neighbor of the active drawing object and between each drawing object on the drawing canvas and the nearest neighbors of that drawing object having the calculated horizontal distances between them equal to the horizontal distance between the active drawing object and the nearest neighbor of the active drawing object and sharing coordinates horizontally with the active drawing object.

11. The optical disk, magnetic storage device, or solid state storage device of claim 10, wherein the horizontal spacing guides are displayed in response to a position of the active drawing object being changed.

12. The optical disk, magnetic storage device, or solid state storage device of claim 10, wherein both horizontal spacing guides and vertical spacing guides are displayed in response to a position of the active drawing object being changed.

13. A system for generating displaying spacing guides between shapes in a diagram, the system comprising:
  a computer; and
  a drawing application program executing on the computer and configured to
  determine nearest neighbors of each shape in the diagram by
    projecting, from each shape, a plurality of horizontal and vertical lines outward along a length of vertical and horizontal outer edges of a bounding box corresponding to each shape, and
    identifying a second shape in the diagram as a nearest neighbor of at least one shape if the second shape has a bounding box that obstructs at least one previously unobstructed horizontal or vertical line of the plurality of the projected plurality of horizontal and vertical lines;
  calculate distances between each shape in the diagram and the nearest neighbors of each shape by calculating a horizontal distance and a vertical distance between the bounding boxes corresponding to the shapes,
  determine whether one or more of the calculated distances are equal to a distance between an active shape and a nearest neighbor of the active shape, and
  upon determining that one or more of the calculated distances are equal to the distance between the active shape and the nearest neighbor of the active shape, display spacing guides between the active shape and the nearest neighbor of the active shape and between each shape in the diagram and the nearest neighbors of that shape having the calculated distances between them equal to the distance between the active shape and the nearest neighbor of the active shape.

14. The system of claim 13, wherein determining the nearest neighbors of each shape further comprises:
  select a next shape from the shapes in the diagram; and
  repeat the projecting and identifying operations until the nearest neighbors for all of the shapes in the diagram have been identified.

15. The system of claim 14, wherein the bounding box corresponding to each shape is defined as a smallest rectangle that fully encloses the shape.

16. The system of claim 13, wherein the spacing guides are only displayed between shapes sharing coordinates horizontally or vertically with the active shape.

17. The system of claim 13, wherein the determination of the nearest neighbors of each shape and the calculation of distances between each shape and the nearest neighbors of that shape are performed for shapes on a visible drawing canvas displayed by the drawing application program.

18. The system of claim 13, wherein the determining, calculating, and displaying operations are performed in response to a position of the active shape being changed.

* * * * *